UNITED STATES PATENT OFFICE.

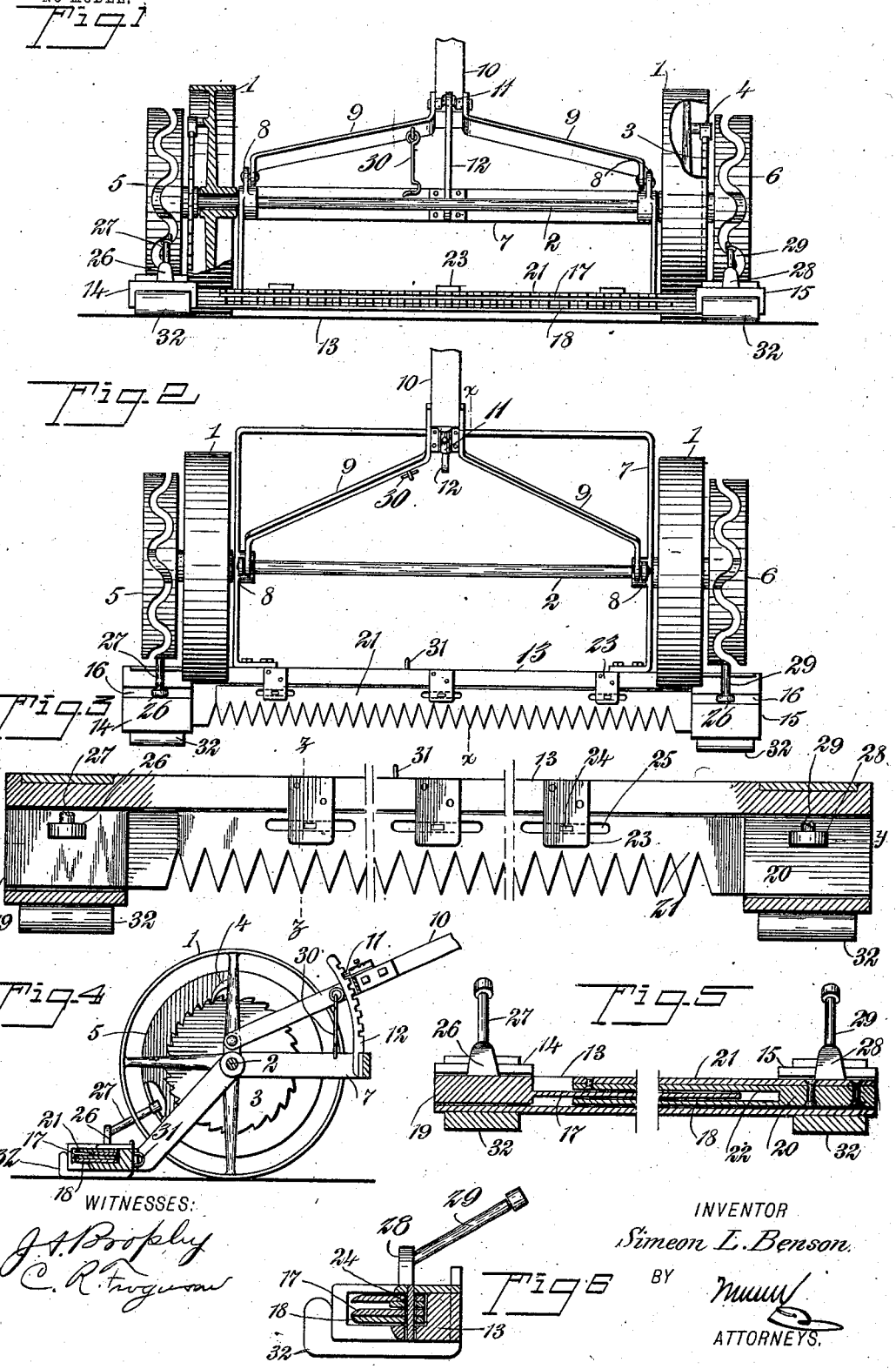

SIMEON L. BENSON, OF CHICAGO, ILLINOIS.

LAWN-MOWER.

SPECIFICATION forming part of Letters Patent No. 725,397, dated April 14, 1903.

Application filed August 1, 1902. Serial No. 117,974. (No model.)

*To all whom it may concern:*

Be it known that I, SIMEON L. BENSON, a citizen of the United States, and a resident of Chicago, in the county of Cook and State of Illinois, have invented a new and Improved Lawn-Mower, of which the following is a full, clear, and exact description.

This invention relates to improvements in lawn-mowers, the object being to provide a lawn-mower of simple construction, having no parts liable to get out of order, and that will operate to cut grass quickly and evenly without clogging the blades.

I will describe a lawn-mower embodying my invention and then point out the novel features in the appended claims.

Reference is to be had to the accompanying drawings, forming a part of this specification, in which similar characters of reference indicate corresponding parts in all the figures.

Figure 1 is a front elevation, partly in section, of a lawn-mower embodying my invention. Fig. 2 is a plan view thereof. Fig. 3 is a plan view, partly in section, of the cutting mechanism. Fig. 4 is a sectional elevation on the line $xx$ of Fig. 2. Fig. 5 is a section on the line $yy$ of Fig. 3, and Fig. 6 is a section on the line $zz$ of Fig. 3.

Referring to the drawings, 1 designates the ground or traction wheels loosely mounted on the axle 2. They are caused to rotate with the axle, however, when the machine is moved forward. For this purpose ratchet-wheels 3 are rigidly attached to the axle and are engaged by pawls 4, pivoted on spokes of the wheel. Rigidly attached to the outer ends of the axle are cam-wheels 5 6. These cam-wheels have peripheral cam-slots arranged in a curved line, the curves of one cam being alternated with the curves of the other cam, the purpose of which will be hereinafter described.

Mounted to swing on the axle 2 is a frame 7, and pivoted to upwardly-extended lugs 8 on the frame are the arms 9 of the handle 10. On the lower end of this handle 10 is a latch-bolt 11, designed to engage in any one of the notches formed in a curved rack 12, extended upward from the rear bar of the frame 7. By this device the handle may be held rigidly at any desired angle with relation to the frame.

Attached to the forwardly and downwardly extended portions of the frame 7 is the cutter-holding bar 13. On the ends of this bar 13 are housings 14 15, in which the ends of the cutters to be described operate, and the top walls of these housings are slotted, as indicated at 16. The cutters 17 and 18 are mounted to slide in the cutter-holding bar alternately in opposite directions. These cutting-bars or sickles have forwardly-extended pointed teeth, as clearly indicated in the drawings. The cutter 17 has a head portion 19, movable in the housing 14, and the cutter 18 has a head 20, movable in the housing 15, and also extended from this head 20, above the cutter 17, is a toothed plate 21. The teeth of this plate correspond substantially to the teeth of the cutters, and this plate is designed as a guard and also for holding the grass in substantially vertical position while being operated upon by the cutters. A stiffening-plate 22 is attached to the under side of the plate 21, near its rear edge. As here shown, this plate 22 is formed integral with the head 20, and the plate 21 is attached thereto by means of bolts. Plates 23 extend forward from the rear portion of the bar 13, and pins 24, attached to these plates, project into slots 25, formed in the cutter-plates and also in the plates 21 and 22. These pins hold the moving parts from moving outward or forward, but permit a longitudinal reciprocation of the same.

From a lug 26 on the head 19, the said lug passing through the slot 16, an arm 27 extends upward and rearward and has a roller on its end for engaging with the walls of the cam-slot in the cam-wheel 5. From a lug 28 on the head 20 an arm 29 extends upward and rearward, and a roller on its end engages with the walls of the cam-slot in the cam-wheel 6.

In operation as the machine is moved forward the cams will cause a rapid and short reciprocation of the cutters in opposite directions, making short and powerful strokes. As the drive or power comes directly on the cutting-blades, loss of power or of motion is prevented.

When it is desired to move the lawn-mower from place to place without cutting the grass, the bolt 11 may be released from the rack 12 and the handle thrown forward, so that a hook 30 on the handle may be engaged with an eye 31 on the rear side of the cutter-holding bar. By this means the cutter-bar will be lifted free from the ground, and no motion will be imparted to the cutters while moving the machine backward, because the pawls 4 will ride over the ratchet-wheels.

When the machine is in use, shoes 32 on the ends of the cutter-plate-holding bar will support the cutters a proper distance above the ground.

Having thus described my invention, I claim as new and desire to secure by Letters Patent—

1. In a lawn-mower, an axle, ground-wheels loosely mounted on the axle, means for causing the axle to rotate with the wheels when moving in one direction, cam-wheels connected to the axle, cutting-blades reciprocated in opposite directions by said cam-wheels, and a reciprocating guard-plate, substantially as specified.

2. In a lawn-mower, an axle, ground-wheels loosely mounted on the axle, pawl and ratchet connections between the wheels and axle, cam-wheels rigidly connected to the axle at the ends, a frame supported on the axle, a cutter-holding bar attached to the forward end of said frame, cutter-plates mounted to reciprocate in opposite directions in said bar, a toothed guard-plate mounted to reciprocate with one of said cutting-plates, and connections between said cutting-plates and the cam-wheels, substantially as specified.

3. In a lawn-mower, an axle, ground-wheels mounted loosely on said axle, pawl and ratchet connections between the axle and wheels, cam-wheels rigidly connected to the ends of the axle, a frame mounted to swing on the axle, cutting-blades carried on the forward portion of said frame, and mounted to reciprocate in opposite directions, a reciprocating toothed guard-plate connections between said cutting-plates and the cam-wheels, a swinging handle mounted on the frame, and means for locking the handle in adjusted position, substantially as specified.

4. In a lawn-mower, ground-wheels, a frame supported by the ground-wheels, a cutter-plate-supporting bar attached to the forward portion of the frame and having housings at its end, the said housings being provided with slots in the upper walls, a cutter-plate having tooth-shaped cutters, a head on one end of said cutter-plate movable in one of the housings, another cutter-plate below the first-named cutter-plate, a head on said other cutter-plate movable in the other housing, a toothed guard-plate extended from said last-named head above the first-named cutter-plate, a stiffening-plate on the under side of said guard-plate, and means operated by a forward movement of the mower, for causing the movements of the several plates, substantially as specified.

5. A lawn-mower comprising ground-wheels, an axle, a frame mounted on the axle, cutters carried on the forward end of said frame, a handle mounted to swing on the frame, a rack extended from the rear part of the frame, a locking device carried by the handle for engaging with said rack, and means independent of the first-named locking device for locking the handle to the forward portion of the frame when said handle is swung forward, substantially as specified.

In testimony whereof I have signed my name to this specification in the presence of two subscribing witnesses.

SIMEON L. BENSON.

Witnesses:
J. V. McMICKEN,
H. C. WILLIAMS.